(No Model.) 2 Sheets—Sheet 1.
H. C. SERGEANT.
COMBINED COUPLING AND RUNNING SUPPORT FOR HOSE.
No. 579,777. Patented Mar. 30, 1897.
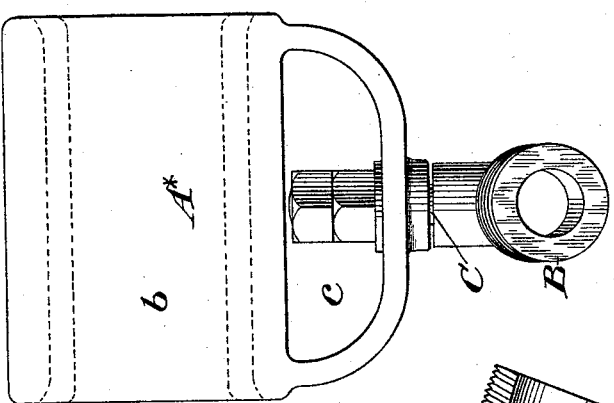
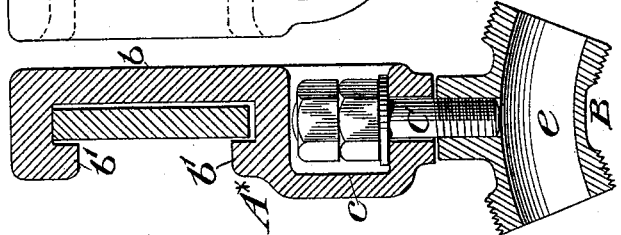
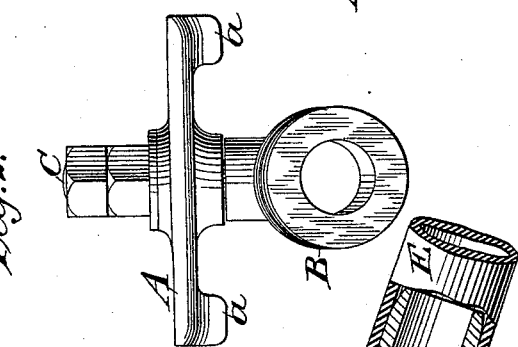
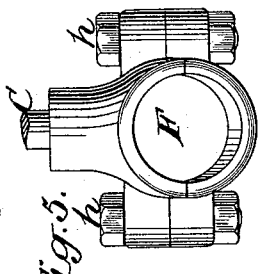
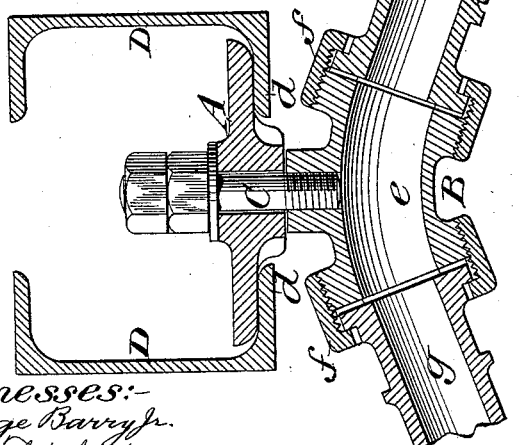
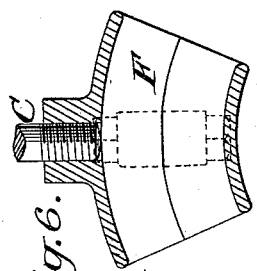
Witnesses:—
George Barry Jr.
M. E. Fletcher
Inventor:—
Henry C. Sergeant
by attorneys
Brown & Seward (No Model.) 2 Sheets—Sheet 2.
H. C. SERGEANT.
COMBINED COUPLING AND RUNNING SUPPORT FOR HOSE.
No. 579,777. Patented Mar. 30, 1897.
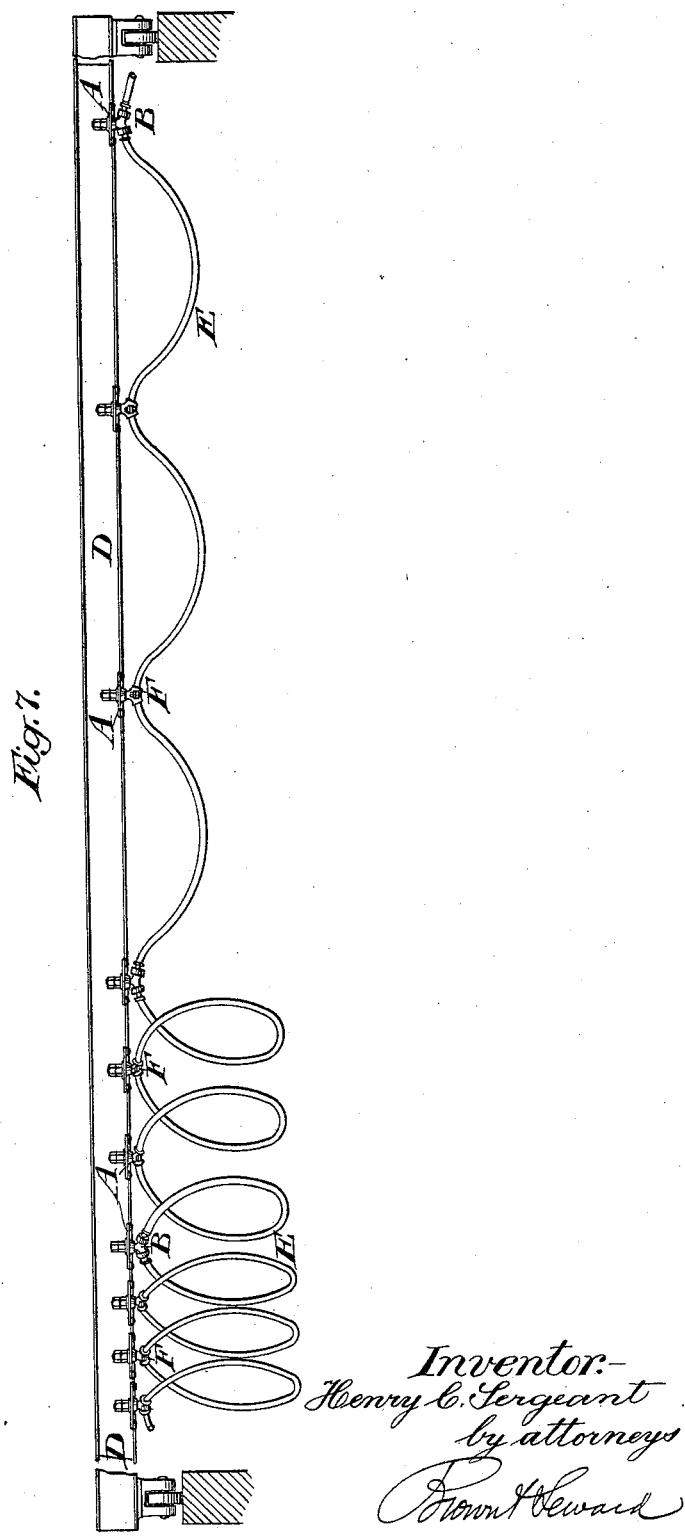

UNITED STATES PATENT OFFICE.

HENRY C. SERGEANT, OF WESTFIELD, NEW JERSEY, ASSIGNOR TO THE INGERSOLL-SERGEANT DRILL COMPANY, OF NEW YORK, N. Y.

COMBINED COUPLING AND RUNNING SUPPORT FOR HOSE.

SPECIFICATION forming part of Letters Patent No. 579,777, dated March 30, 1897.

Application filed July 9, 1896. Serial No. 598,506. (No model.)

*To all whom it may concern:*

Be it known that I, HENRY C. SERGEANT, of Westfield, in the county of Union and State of New Jersey, have invented a new and useful Improvement in a Combined Coupling and Running Support for Hose, of which the following is a specification.

The object of this invention is especially to provide for the support and convenient control of a hose which is employed between two points the distance between which is constantly or frequently varied, as, for example, between an air-reservoir or steam-generator and a movable motor for the supply to the latter of air or steam from the former.

The accompanying drawings illustrate my invention applied in connection with the beam or transom of a traveling crane.

Figure 1 represents a transverse section of the cross-beam or transom of the crane and a corresponding section of my combined coupling and running support applied to said beam or transom. Fig. 2 represents a side view of the combined coupling and support. Fig. 3 represents a transverse section of a transom or beam of another form and of a corresponding section of a combined coupling and running support adapted to said beam, illustrating a modification of my invention. Fig. 4 represents a side view of the combined coupling and support shown in Fig. 3. Figs. 5 and 6 represent, respectively, an end view and a section at right angles thereto of a hose-support to be used in connection with my combined hose support and coupling. Fig. 7 represents a side view of a beam or transom from which a hose is suspended by my combined coupling and running support.

The combined coupling and running support consists of a slide or runner, as A, Fig. 1, or A*, Figs. 3 and 4, and a duplex coupling B, arranged below and dependent from said support. This suspension I generally make by an upright pivot or swivel bolt C, which leaves the coupling free to turn horizontally in relation to the runner.

In the example shown in Fig. 1, which is adapted to a duplex channel-beam or transom D D, the runner A consists of a horizontal plate having its edges slightly rounded on the underside and having downward projections $a\ a$ to enter between the lower flanges $d$ of the two members of the beam and so guide the runner while it is supported and free to slide upon the track constituted by said flanges.

In the example shown in Figs. 3 and 4, which is adapted to a single beam or track D, consisting of a flat bar set up edgewise, the runner A* is in the form of a yoke consisting of a plate $b$, having flanges $b'$ to overlap the upper and lower edges of the beam D, and having depending from and below it a loop or pocket $c$, to which the coupling B is swiveled by an upright pivot C, so that it may turn freely while the runner slides on the beam.

The main portion or body $e$ of the coupling is externally screw-threaded at both ends to receive upon it nuts $f f$, by which are secured to it the two nipples $g$, to which the lengths or sections of hose E are connected, the said screw-threads, nuts, and nipples being like those of ordinary couplings. The body $e$ is arched or curved, as shown in Figs. 1 and 3, to conform in a sufficient degree to the loops or coils into which the hose may form itself or be formed as its terminal parts approach each other.

A combined coupling and support such as above described is applied to connect every two adjacent lengths or sections of a train of hose. At suitable intervals between these combined runners and couplings I use, for the support or suspension of the hose in the form of loops or coils below the beam or track D, one or more runners, such as A or A*, to which in place of a hose-coupling I apply a simple hanger F, such as is shown in Figs. 5 and 6, consisting of a short tube curved substantially like the body of the coupling and swiveled in the same way to the runner by a pivot C. In order to provide for the insertion of the hose in these hangers F, they are divided longitudinally, and the two parts of which each is composed are flanged and screwed together by screw bolts and nuts $h$, as shown in Fig. 5.

In Fig. 7, which represents a train of hose supported on a beam by my combined runners and couplings and by the swiveled hangers just described, there are represented two of the swiveled hangers between every two of my combined runners and couplings. In the last-mentioned figure a portion of the train of hose is shown nearly straight, in which condition the couplings and runners stand nearly parallel with the beam, but the other portions of the train are shown in a looped or coiled form, which the intervening portions are caused to assume as the terminal portions are caused to approach each other, the swivel or pivotal connection between the couplings or hangers and the runners permitting the hose to assume the coiled form.

What I claim as my invention is—

1. A combined coupling and support for hose consisting of a runner and a hose-coupling dependent therefrom substantially as herein described.

2. A combined coupling and support for hose consisting of a runner and a duplex hose-coupling dependent therefrom substantially as herein described.

3. A combined coupling and support for hose consisting of a runner, a duplex hose-coupling and a swivel connection by which the said coupling is dependent from said runner, substantially as herein described.

4. The combination with the beam of a traveling crane, of a runner adapted to slide on said beam, a duplex hose-coupling, and a swivel connection by which the said coupling is dependent from said runner below the said beam, substantially as herein described.

HENRY C. SERGEANT.

Witnesses:
FREDK. HAYNES,
GEORGE BARRY, Jr.